US012226835B2

(12) United States Patent
Hua et al.

(10) Patent No.: US 12,226,835 B2
(45) Date of Patent: Feb. 18, 2025

(54) METHODS OF FORMING METAL NANOMATERIALS

(71) Applicant: Battelle Energy Alliance, LLC, Idaho Falls, ID (US)

(72) Inventors: Bin Hua, Ammon, ID (US); Meng Li, Ammon, ID (US); Dong Ding, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 17/445,687

(22) Filed: Aug. 23, 2021

(65) Prior Publication Data
US 2022/0184702 A1 Jun. 16, 2022

Related U.S. Application Data

(60) Provisional application No. 63/124,193, filed on Dec. 11, 2020.

(51) Int. Cl.
*B22F 9/26* (2006.01)
*B22F 1/054* (2022.01)
(Continued)

(52) U.S. Cl.
CPC .............. *B22F 9/26* (2013.01); *B22F 1/054* (2022.01); *B22F 2201/013* (2013.01);
(Continued)

(58) Field of Classification Search
CPC .............. B22F 1/054; B22F 2201/013; B22F 2301/25; B22F 2301/45; B22F 2302/25;
(Continued)

(56) References Cited

U.S. PATENT DOCUMENTS 5,336,655 A   8/1994 Basini et al.
5,855,815 A   1/1999 Park et al.
(Continued)

FOREIGN PATENT DOCUMENTS

CN   101362080 A   2/2009
WO   2019/215630 A2   11/2019
WO   2020/245621 A1   12/2020

OTHER PUBLICATIONS

Triki et al. ("Ruthenium catalysts supported on TiO2 prepared by sol-gel way for p-hydroxybenzoic acid wet air oxidation." Journal of sol-gel science and technology 48.3 (2008): 344-349.) (Year: 2008).*

(Continued)

*Primary Examiner* — Ricardo D Morales
(74) *Attorney, Agent, or Firm* — TraskBritt

(57) ABSTRACT

A method of forming a metal nanomaterial comprises forming a precursor solution comprising a metal precursor and a metal oxide precursor. A complexing agent is added to the precursor solution, and the metal precursor and the metal oxide precursor are hydrolyzed to form a sol. The sol is heated to form a gel, which is calcined to incorporate metal cations from the metal precursor into a metal oxide lattice from the metal oxide precursor. The calcined gel is exposed to a reducing agent to exsolve the metal from the metal oxide lattice and to form a metal nanomaterial comprising a metal and a metal oxide is formed. Additional methods of forming a metal nanomaterial are also disclosed.

27 Claims, 3 Drawing Sheets

(51) Int. Cl.
  *B82Y 30/00* (2011.01)
  *B82Y 40/00* (2011.01)
  *H01M 4/90* (2006.01)

(52) U.S. Cl.
  CPC ....... *B22F 2301/25* (2013.01); *B22F 2301/45* (2013.01); *B22F 2302/25* (2013.01); *B22F 2304/054* (2013.01); *B22F 2304/056* (2013.01); *B22F 2304/058* (2013.01); *B82Y 30/00* (2013.01); *B82Y 40/00* (2013.01); *H01M 4/9041* (2013.01)

(58) Field of Classification Search
  CPC .......... B22F 2304/054; B22F 2304/056; B22F 2304/058; B82Y 30/00; B82Y 40/00; H01M 4/9041
  See application file for complete search history.

(56) References Cited

U.S. PATENT DOCUMENTS

| | | | |
|---|---|---|---|
| 7,410,717 | B2 | 8/2008 | Moon et al. |
| 9,556,075 | B2 | 1/2017 | Deville et al. |
| 10,529,975 | B2 | 1/2020 | Song et al. |
| 2009/0005238 | A1* | 1/2009 | Falaras .................. B01J 21/063 427/256 |
| 2009/0090626 | A1 | 4/2009 | Holt et al. |
| 2011/0005921 | A1 | 1/2011 | Brault |
| 2011/0135945 | A1 | 6/2011 | Monredon-Senani et al. |
| 2011/0259244 | A1 | 10/2011 | Herbig et al. |
| 2017/0313584 | A1 | 11/2017 | Mamedov |
| 2019/0040535 | A1 | 2/2019 | MacFarlane et al. |
| 2021/0024439 | A1 | 1/2021 | Radaelli et al. |
| 2021/0170369 | A1 | 6/2021 | Jiang et al. |
| 2022/0056596 | A1 | 2/2022 | Li et al. |

OTHER PUBLICATIONS

Saito et al. ("Synergistic effect of MgO and CeO2 as a support for ruthenium catalysts in ammonia synthesis." Catalysis letters 106.3 (2006): 107-110.) (Year: 2006).*
Ahmad ("Nanostructured cerium oxide (Ceria): Electrolyte for IT-SOFC." Int J Nano Rech 1.1 (2018): 11.) (Year: 2018).*
Gonzalez et al. ("Physicochemical characterization of Pt and Ir particles deposited on Ce (1-x) Ru (x) O2 solid-solutions for CO oxidation." MRS Advances 4.61 (2019): 3433-3440.) (Year: 2019).*
Naeem et al. (Exsolution of Metallic Ru Nanoparticles from Defective, Fluorite-Type Solid Solutions Sm2RuxCe2—-xO7 to Impart Stability on Dry Reforming Catalysts. ACS Catalysis 2020 10 (3), 1923-1937). (Year: 2020).*
Nguyen et al. ("Ultrastable iridium-ceria nanopowders synthesized in one step by solution combustion for catalytic hydrogen production" J. Mater. Chem. A, 2014, 2, 19822). (Year: 2014).*
Deganello et al. ("Phase analysis and oxygen storage capacity of ceria-lanthana-based TWC promoters prepared by Sol-Gel routes." Journal of Solid State Chemistry 163.2 (2002): 527-533.). (Year: 2002).*
Aitbekova et al. ("Low-temperature restructuring of CeO2-supported Ru nanoparticles determines selectivity in CO2 catalytic reduction." Journal of the American Chemical Society 140.42 (2018): 13736-13745.) (Year: 2018).*
Aitbekova et al., "Low-Temperature Restructuring of CeO2-Supported Ru Nanoparticles Determines Selectivity in CO2 Catalytic Reduction," J. Am. Chem. Soc., vol. 140, (2018), pp. 13736-13745.
Bai et al., "Highly Active and Selective Hydrogenation of CO2 to Ethanol by Ordered Pd—Cu Nanoparticles," J. Am. Chem. Soc., vol. 139, (2017), pp. 6827-6830.
Basbus et al., "Revisiting the Crystal Structure ofBaCe0.4Zr0.4Y0.2O3-d Proton Conducting Perovskite and Its Correlation with Transport Properties," ACS Appl. Energy Mater., vol. 3, (2020), pp. 2881-2892.
Capdevila-Cortada, Ammonia Synthesis, "Electrifying the Haber-Bosch," Nature Catalysis, vol. 2, (Dec. 2019), pp. 1055.
Chen et al., "Aqueous CO2 Reduction at Very Low Overpotential on Oxide-Derived Au Nanoparticles," J. Am. Chem. Soc., vol. 134, (2012), pp. 19969-19972.
Cored et al., "Hydrothermal Synthesis of Ruthenium Nanoparticles with a Metallic Core and a Ruthenium Carbide Shell for Low-Temperature Activation of CO2 to Methane," J. Am. Chem. Soc., vol. 141, (2019), pp. 19304-19311.
Fabbri et al., "Materials Challenges Toward Proton-Conducting Oxide Fuel Cells: a Critical Review," Chem. Soc. Rev., vol. 39, (2010), pp. 4355-4369.
Fan et al., "Strategies in Catalysts and Electrolyzer Design for Electrochemical CO2 Reduction Toward C2+ Products," Sci. Adv., vol. 6, eaay3111, (Feb. 21, 2020), pp. 1-17.
Gao et al., "Rational Catalyst and Electrolyte Design for CO2 Electroreduction Towards Multicarbon Products," Nature Catalysis, vol. 2, (Mar. 2019), pp. 198-210.
Jing et al., "Structural Evolution of Ag—Pd Bimetallic Nanoparticles through Controlled Galvanic Replacement: Effects of Mild Reducing Agents," Chem. Mater., vol. 27, (2015), pp. 2172-2180.
Jolivet et al., "Design of Oxide Nanoparticles by Aqueous Chemistry," J. Sol-Gel. Sci. Technol., vol. 46, (2008), pp. 299-305.
Kyriakou et al., "An Electrochemical Haber-Bosch Process," Joule, vol. 4, (Jan. 15, 2020), pp. 142-158.
Li et al., "Electroreduction of Carbon Monoxide to Liquid Fuel on Oxide-Derived Nanocrystalline Copper," Nature, vol. 508, (Apr. 24, 2014), 17 pages.
Liu et al., "Noble Metal-Metal Oxide Nanohybrids With Tailored Nanostructures for Efficient Solar Energy Conversion, Photocatalysis and Environmental Remediation," Energy & Environ. Sci., vol. 10, (2017), pp. 402-434.
Nahar, "Sol-Gel Chemistry: An Advanced Technique to Produce Macroscopic Nanostructures of Metal and Semiconductor Colloids," Virginia Commonwealth University Theses and Dissertations, (2017), 216 pages.
Niwa et al., "The Effect of Lanthanide Oxides as a Support for Ruthenium Catalysts in Ammonia Synthesis," Journal of Catalysis, vol. 162, (1996), pp. 138-142.
Pudukudy et al., "Methane Decomposition Over Ni, Co and Fe Based Monometallic Catalysts Supported on Sol Gel Derived SiO2 Microflakes," Chem. Eng. J., vol. 262, (2015), pp. 1009-1021.
Saito et al., "Synergistic Effect of MgO and CeO2 as a Support for Ruthenium Catalysts in Ammonia Synthesis," Catalysis Letters, vol. 106, Nos. 3-4, (Feb. 2006), pp. 107-110.
Smith et al., "Current and Future Role of Haber-Bosch Ammonia in a Carbon-Free Energy Landscape," Energy & Environ. Sci., vol. 13, (2020), pp. 331-344.
Van Deelen et al., "Control of Metal-Support Interactions in Heterogeneous Catalysts to Enhance Activity and Selectivity," Nature Catalysis, vol. 2, (Nov. 2019), pp. 955-970.
Wang et al., "CO2 Hydrogenation to Formate and Methanol as an Alternative to Photo- and Electrochemical CO2 Reduction," Chem. Rev., vol. 115, (2015) pp. 12936-12973.
Zhang et al., "Selective Hydrogenation over Supported Metal Catalysts: From Nanoparticles to Single Atoms," Chem. Rev., vol. 120, (2020), pp. 683-733.
Kortlever et al. (J. Phys. Chem. Lett. 2015, 6, 4073-4082). (Year: 2015).
Li et al. (Angew. Chem. Int. Ed. 2017, 56, 10761-10765). (Year: 2017).
Guo et al, "Performance and durability of a layered proton conducting solid oxide fuel cell fueled by the dry reforming of methane", Sep. 13, 2017, RSC Advances, vol. 7, p. 44319-44325. (Year: 2017).
Jimenez et al. (Applied Catalysis B: Environmental 107 '2011' 210-220). (Year: 2011).
Zhao et al "Layered-Double-Hydroxide Nanosheets as Efficient Visible-Light-Driven Photocatalysts for Dinitrogen Fixation", Sep. 28, 2017, Advanced Materials, vol. 29, article #1703828, p. 1-10. (Year: 2017).

(56) References Cited

OTHER PUBLICATIONS

Luo et al "Effect of La2O3 on Ru/CeO2—La2O3 Catalyst for Ammonia Synthesis", Oct. 14, 2009, Catalysis Letters, 133, 382-387. (Year: 2009).

Kim et al., "Characteristics of Sr1-x Yx Ti1—y Ruy O3+/-d and Ru-impregnated Sr1-x Yx TiO3+/-d perovskite catalysts as SOFC anode for methane dry reforming", Jan. 28, 2020, Applied Surface Science, 510, 145450. (Year: 2020).

\* cited by examiner

METHODS OF FORMING METAL NANOMATERIALS

CROSS-REFERENCE TO RELATED APPLICATION

This application claims the benefit under 35 U.S.C. § 119(e) of U.S. Provisional Patent Application Ser. No. 63/124,193, filed Dec. 11, 2020, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure relates generally to methods of forming metal nanomaterials. More specifically, the disclosure relates to forming the metal nanomaterials including a metal at a desired metal size using a complexing agent.

BACKGROUND

Metal-metal oxide catalysts are used to catalyze many industrial reactions and electrochemical processes, such as in the petrochemical industry (e.g., ammonia industry and ethylene industry), energy industry (e.g., Li-ion battery, metal air battery, supercapacitors, fuel cells, and electrolyzers for new fuel-efficient car and biomass conversion). In the metal-metal oxide catalysts, metal nanoparticles are stabilized on a metal oxide support. The metal-metal oxide catalysts, which are also known in the art as supported metallic catalysts, are functional components in various heterogeneous catalysis applications, such as in carbon dioxide ($CO_2$) hydrogenation. Physicochemical properties of the supported metallic catalysts play a role in determining catalytic behavior, but control of electronic and surface structure of the metals of the supported metallic catalysts during their production is challenging. Shape, composition, and size of the metals have been investigated. Currently, the metal nanoparticles with small sizes are formed by expensive and time-consuming processes, such as physical vapor deposition and electron beam physical vapor deposition. Control of the size of the supported metal nanomaterials by conventional large-scale production processes is also problematic.

BRIEF SUMMARY

A method of forming a metal nanomaterial is disclosed and comprises forming a precursor solution comprising a metal precursor and a metal oxide precursor. A complexing agent is added to the precursor solution, and the metal precursor and the metal oxide precursor are hydrolyzed to form a sol. The sol is heated to form a gel. The gel is calcined to incorporate metal cations from the metal precursor into a metal oxide lattice from the metal oxide precursor. The calcined gel is exposed to a reducing agent to exsolve the metal from the metal oxide lattice and to form a metal nanomaterial comprising a metal and a metal oxide is formed.

Another method of forming a metal nanomaterial is disclosed and comprises providing an aqueous precursor solution comprising a metal precursor, a metal oxide precursor, and a complexing agent. The metal precursor and the metal oxide precursor are hydrolyzed to form a sol. Metal cations of the metal precursor are incorporated into a metal oxide of the metal oxide precursor. The metal cations are exsolved to form a metal nanomaterial comprising a metal and the metal oxide. The metal of the metal nanomaterial exhibits a substantially uniform size.

Yet another method of forming a metal nanomaterial is disclosed and comprises adding a complexing agent to a precursor solution comprising a metal precursor and a metal oxide precursor. The metal precursor and the metal oxide precursor are hydrolyzed to form a sol. Metal cations of the metal precursor are incorporated into a metal oxide of the metal oxide precursor. The metal cations are calcined to form a metal nanomaterial comprising the metal and the metal oxide, the metal comprising a predetermined particle size.

BRIEF DESCRIPTION OF THE DRAWINGS

While the specification concludes with claims particularly pointing out and distinctly claiming what are regarded as embodiments of the disclosure, various features and advantages of this disclosure may be more readily ascertained from the following description of example embodiments provided with reference to the accompanying drawings, in which:

DETAILED DESCRIPTION

Figure 1:
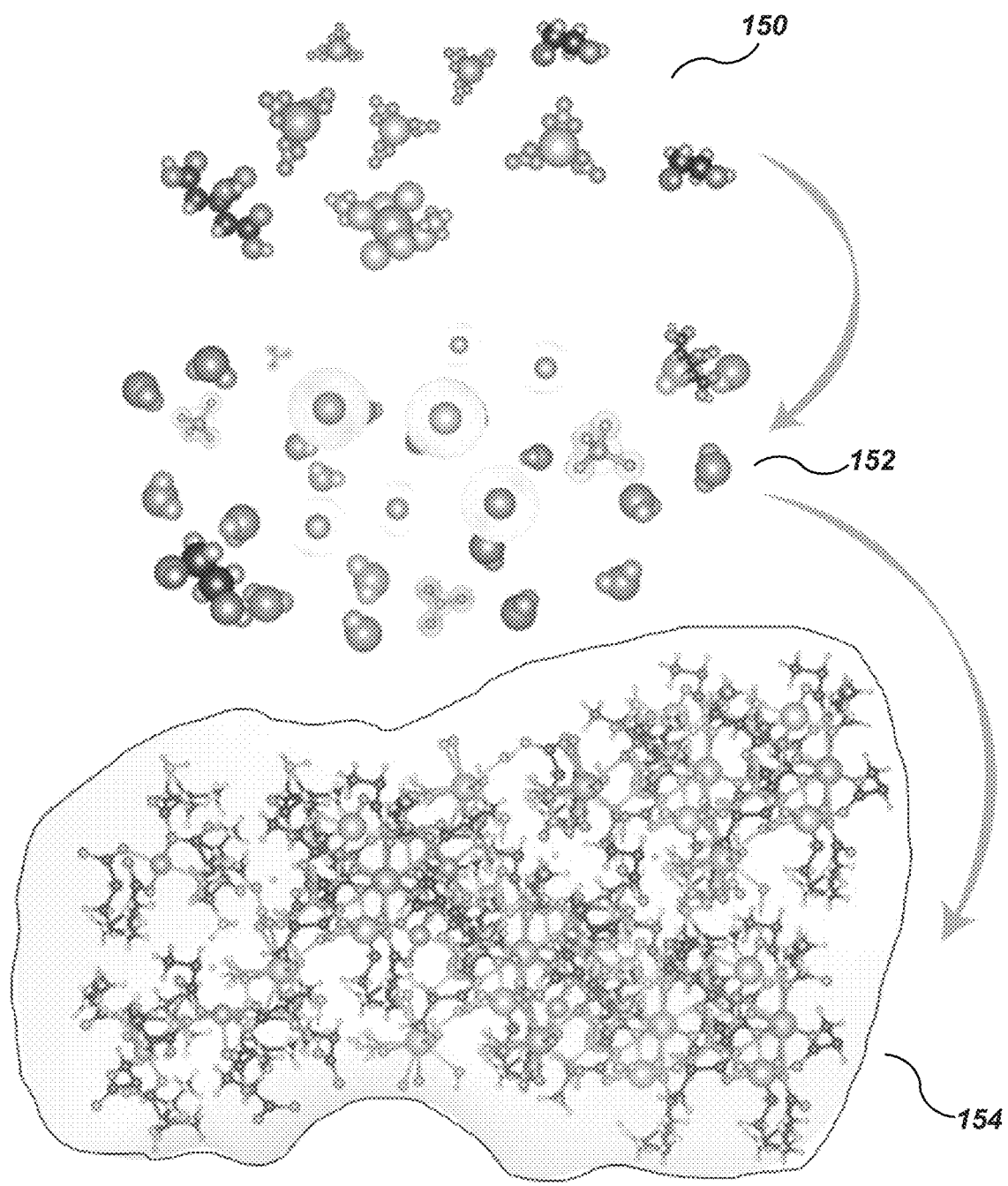
FIG. 1 is a schematic illustrating a method of producing the metal nanomaterial in accordance with embodiments of the disclosure.

Methods of forming a metal material, such as a metal nanomaterial, are disclosed. The metal nanomaterial includes a metal component and a metal oxide component. In the metal nanomaterial, metal particles (e.g., metal nanoparticles) are stabilized on a metal oxide support. The metal nanomaterial is formed by adding a complexing agent to a precursor solution that includes a precursor of the metal (e.g., a metal precursor) and a precursor of the metal oxide (e.g., a metal oxide precursor). By controlling an amount (e.g., a concentration) of the complexing agent in the precursor solution, a hydrolysis rate of metal cations in the precursor solution may be controlled, which enables a size (e.g., a particle size) of the metal in the resulting metal nanomaterial to be controlled. The particle size of the metal in the resulting metal nanomaterial may be controlled from a single atom (SA) to about 999 nm depending on the concentration of the complexing agent added to the precursor solution. A desired size of the metal is achieved by appropriately selecting the amount of complexing agent added to the precursor solution. By changing the amount of complexing agent added to the precursor solution in the disclosed complexing agent tailoring method, the size of the metal may be increased or decreased depending on desired catalytic properties of the metal nanomaterial. The resulting metal nanomaterial includes the metal uniformly dispersed throughout the metal oxide, with substantially all of the metal being the desired size.

The metal nanomaterial is formed by a one pot, sol-gel process that is less complex and less expensive than conventional processes of forming metal nanomaterials with small sizes, (e.g., less than about 999 nm). The methods according to embodiments of the disclosure are wet chemical synthesis methods that are suitable for mass production. Therefore, the metal nanomaterial may be produced in large quantities, such as in commercial quantities. In addition, the metal nanomaterial is formed without using complex equipment or specialized equipment.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the disclosure are for illustrative purposes only, and are not meant to be actual views of any particular material, device, or system.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figure. Unless otherwise specified, the spatially relative terms are intended to encompass different orientations of the materials in addition to the orientation depicted in the figure. For example, if materials in the figure are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, and arrangement of one or more of at least one apparatus facilitating operation of one or more of the structure and the apparatus in a pre-determined way.

As used herein, the terms "selectively form" or "selectively produce," or grammatical equivalents thereof, refer to forming one carbonaceous product preferentially to another carbonaceous product. The selectively formed carbonaceous product may be formed at greater than or equal to about 51%, while the other carbonaceous product is formed at less than or equal to about 49%. The selectively formed carbonaceous product may, for example, be formed at greater than or equal to about 60%, greater than or equal to about 70%, greater than or equal to about 80%, greater than or equal to about 90%, or greater than or equal to about 95%.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "substantially all" means and includes greater than about 95%, such as greater than about 99%.

As used herein, the terms "about" and "approximately" in reference to a numerical value for a particular parameter are inclusive of the numerical value and a degree of variance from the numerical value that one of ordinary skill in the art would understand is within acceptable tolerances for the particular parameter. For example, "about" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof.

As used herein, the term "may" with respect to a material, structure, feature or method act indicates that such is contemplated for use in implementation of embodiments of the disclosure and such term is used in preference to the more restrictive term "is" so as to avoid any implication that other, compatible materials, structures, features and methods usable in combination therewith should or must be excluded.

As used herein, the terms "catalyst material" and "catalyst" and their grammatical equivalents each mean and include a material formulated to promote one or more reactions, resulting in the formation of a product.

As used herein, the term "negative electrode" and grammatical equivalents means and includes an electrode having a relatively lower electrode potential in an electrochemical cell (e.g., lower than the electrode potential in a positive electrode therein).

Conversely, as used herein, the term "positive electrode" and grammatical equivalents means and includes an electrode having a relatively higher electrode potential in an electrochemical cell (e.g., higher than the electrode potential in a negative electrode therein).

As used herein, the term "electrolyte" and grammatical equivalents means and includes an ionic conductor, which can be in a solid state, a liquid state, or a gaseous state (e.g., plasma).

The metal nanomaterial may range in size (e.g., the particle size) from single atoms to about 999 nm, such as from about 0.1 nm to about 50 nm or from about 0.1 nm to about 100 nm. The size of the metal may include the single atoms. Clusters (e.g., nanoclusters (NC)) of the metal may include from 2 metal atoms to 100 metal atoms, such as from 5 metal atoms to 20 metal atoms, from 10 metal atoms to 40 metal atoms, from 20 metal atoms to 50 metal atoms, from 30 metal atoms to 60 metal atoms, from 40 metal atoms to 70 metal atoms, from 50 metal atoms to 80 metal atoms, from 60 metal atoms to 90 metal atoms, or from 70 metal atoms to 100 metal atoms, with a particle size range from about 0.1 nm to about 1 nm. The nanoparticles (NP) may exhibit a particle size of from greater than or equal to about 1 nm to about 999 nm, such as from about 1 nm to about 500 nm, from about 1 nm to about 100 nm, from about 1 nm to about 20 nm, from about 1 nm to about 10 nm, from about 1 nm to about 5 nm, from about 1 nm to about 4 nm, or from about 2 nm to about 5 nm.

Forming the metal nanomaterial by methods according to embodiments of the disclosure may enable the metal in the metal nanomaterial to be formed at a desired size. In other words, substantially all of the metal is present in the metal nanomaterial at a single, desired size. In contrast, conventional processes of forming metal nanomaterials produce the metal at multiple sizes. The metal may be formed as single atoms, clusters, or nanoparticles and used with a desired metal oxide in the metal nanomaterial. For instance, single atoms of the metal may be present in the metal nanomaterial, nanoclusters of the metal may be present in the metal nanomaterial, or nanoparticles of the metal may be present in the metal nanomaterial. Alternatively, the metal nanomaterial may include a combination of two or more of the single atoms of the metal, the clusters of the metal, or the nanoparticles of the metal.

The complexing agent tailoring method according to embodiments of the disclosure is a hydrothermal exsolution method of forming the metal nanomaterial from a precursor solution, which includes precursor compounds of the metal and of the metal oxide. The precursor compounds are dissolved in water and calcined, such as in air, to incorporate metal cations into a host lattice of the metal oxide, forming a single-phase solid solution. Upon reduction in hydrogen, the metal cations are released (e.g., exsolved) from the host lattice to the oxide surface, leading to the formation of the metal nanomaterial as an M-MO heterostructure, with the metal substantially homogeneously dispersed throughout the M-MO heterostructure. Since the dispersity of the metal cations in the metal nanomaterial may be controlled by tuning of the hydrolysis rate, the size of the released metal may be easily controlled.

The method includes forming the precursor solution that contains the metal precursor and the metal oxide precursor. To form the precursor solution, the precursor compound of the metal (e.g., the metal precursor) is dissolved in water. The water may, for example, be distilled water. The metal precursor may be a metal salt or one or more metal salt, such as a nitric salt of the metal of the metal nanomaterial, a chloride salt of the metal of the metal nanomaterial, an ammonium salt of the metal of the metal nanomaterial, an amine salt of the metal of the metal nanomaterial, or a combination thereof. By way of example only, the metal salt may be an ammonium chloride salt, such as ammonium hexachloroiridate ($(NH_4)_2IrCl_6$), or an amine chloride salt, such as $Ru(NH_3)_6Cl_3$. However, other ammonium halide salts or other ammonium salts that include the desired metal may be used as the precursor compound of the metal. The metal of the metal precursor may be a transition metal, such as iron, cobalt, nickel, copper, ruthenium, rhodium, palladium, silver, iridium, platinum, or gold. In some embodiments, the metal is iridium. In other embodiments, the metal is ruthenium. While examples herein may describe using iridium or ruthenium as the metal of the metal nanomaterial, other transition metals may be used.

The metal oxide precursor is also added to the precursor solution, with the metal oxide of the precursor compound corresponding to the metal oxide component of the metal nanomaterial. The metal oxide precursor may include one or more metal salts, such as one or more metal nitrate salts or metal chloride salts. The metal oxide precursor may, for example, include a nitrate compound of one or more lanthanide elements, such as cerium nitrate ($Ce(NO_3)_3.6H_2O$) or samarium nitrate ($Sm(NO_3)_3.6H_2O$). However, other metal salts that include the desired metal oxide may be used as the precursor compound of the metal oxide. The lanthanide element of the metal oxide may be a lanthanide element that is reducible. By way of example only, the metal oxide produced from the metal oxide precursor may be ceria ($CeO_2$), samarium doped ceria (SDC), lanthanum doped ceria (LDC), another doped ceria-based material, or other metal oxide material formulated to be used as a support in an M-MO heterostructure. While examples herein may describe using the SDC or the LDC as the metal oxide of the metal nanomaterial, other metal oxides may be used. After dissolving the metal precursor and the metal oxide precursor, a portion of the water may be removed from the precursor solution.

The precursor solution may include the metal precursor at from about X to about Y, with the balance including the metal oxide precursor, depending on a desired loading of the metal in the metal nanomaterial. The mass loading of the metal may be in the range from about 0.1% by weight (wt. %) to about 20 wt. %. The metal nanomaterial produced according to embodiments of the disclosure may include the metal at a loading of from about 0.1 wt. % to about 10 wt. %, such as from about 0.1 wt. % to about 5 wt. %, from about 0.5 wt. % to about 10 wt. %, from about 1.0 wt. % to about 10 wt. %, from about 0.5 wt. % to about 5 wt. %, or from about 0.1 wt. % to about 8 wt. %.

The complexing agent is added to the precursor solution. The complexing agent may include, but is not limited to, citric acid, ethylene glycol, ethylenediaminetetraacetic acid (EDTA), ethylene glycol tetraacetic acid (EGTA), nitrilotriacetic acid, n-hydroxyethylethylenediaminetriacetic acid (HEDTA), a polycarboxylate, a polyol, a phosphate, a sulfate, or combinations thereof. The complexing agent may be added to the precursor solution in a concentration sufficient to change (e.g., increase, decrease) a rate of hydrolysis of the metal precursor relative to the hydrolysis rate of the metal precursor without the complexing agent. A sufficient amount of the complexing agent may be added to form complexes with metal ions of the metal precursor without forming complexes with other metal ions in the precursor solution. The complexing agent may be added to the precursor solution at a molar ratio of metal ions:complexing agent of from about 1.0:0.2 to about 1.0:6.0, such as from about 1.0:0.4 to about 1.0:2.0. If multiple complexing agents are used, the molar ratio of metal ions:complexing agent 1:complexing agent 2 may range from about 1.0:0.1:0.1 to about 1.0:3.0:3.0. The molar ratio of complexing agent 1:complexing agent 2 may range from 1.0:1.0 to 1.0:3.0. Without being bound by any theory, controlling the hydrolysis rate of the metal precursor is believed to affect the size of the metal in the resulting metal nanomaterial. If small metal particle sizes (e.g., single atoms or nanoclusters) are desired in the metal nanomaterial, a relatively high concentration of the complexing agent relative to the metal ions may be added to the precursor solution. If larger metal particle sizes (e.g., nanoparticles) are desired in the metal nanomaterial, a relatively lower concentration of the complexing agent relative to the metal ions may be added to the precursor solution. Since the complexing agent is a relatively inexpensive material, use of the complexing agent does not add considerably to the cost of producing the metal nanomaterial. In some embodiments, the complexing agent includes citric acid and ethylene glycol and the complexing agent is present in the precursor solution at a molar ratio of metal ions:citric acid:ethylene glycol of 1.0:0.1:0.1.

The metal precursor is hydrolyzed, forming the metal ions (e.g., metal cations) that are substantially homogeneously dispersed in the precursor solution. The precursor solution may be heated in an oxidizing environment, such as in air, to further increase the rate of the hydrolysis and to form a sol. The precursor solution may be heated at a temperature of from about 50° C. to about 150° C., such as from about 60° C. to about 150° C., from about 70° C. to about 150° C., from about 50° C. to about 100° C., from about 60° C. to about 100° C., from about 70° C. to about 100° C., from about 80° C. to about 100° C., or from about 90° C. to about 100° C. Heating may also remove some of the water from the precursor solution. The metal cations are incorporated into the complexing agent during a chelation process of forming the sol.

Following the hydrolysis, a substantially homogenous gel is formed by heating the sol to a higher temperature. The sol is transformed into the gel after evaporating water from the precursor solution. The sol may be heated to a temperature within a range of from about 200° C. to about 300° C., such as from about 200° C. to about 250° C., from about 220° C. to about 250° C., from about 220° C. to about 300° C., from 260° C. to about 300° C. The homogenous gel is calcined at a high temperature, such as a temperature of from about 600° C. to about 1000° C., following which the metal becomes incorporated into a metal oxide host lattice, forming an ordered solid solution. The metal ions are exsolved on a surface of the metal oxide, producing the metal-metal oxide catalyst by exposing to a reducing atmosphere. The metal ions are exsolved as one or more of stabilized single atoms, nanoclusters, or nanoparticles on the surface of the metal oxide. The metal cations are homogenously dispersed in the host lattice at an atomic level, forming an ordered solid solution. A greater dispersion (e.g., a higher dispersity) of the metal cations in the solid solution may enable the formation of smaller metals, while a lower dispersion (e.g., a lower dispersity) of the metal cations in the solid solution may form larger metals.

The metal may be exsolved and reduced (e.g., chemically reduced), such as by exposing the solid solution to a reducing environment, such as a reducing gas. By way of example only, the reducing gas may be hydrogen gas ($H_2$) and the solid solution may be exposed to the $H_2$. The hydrothermal reduction may release the metal cations from the host lattice, exsolving the metals on the surface of the metal oxide to form the metal nanomaterial. The metal cations may, therefore, be released from the host lattice upon reduction. The resulting metal particle sizes may include one or more of the single atoms, the nanoclusters, or the nanoparticles. In some embodiments, the metal includes single atoms. In other embodiments, the metal includes nanoclusters. In yet other embodiments, the metal includes single atoms and nanoclusters. In still yet other embodiments, the metal includes nanoparticles. The resulting metal nanomaterial may, for example, be a ceria- and transition metal-based material, such as a ceria- and iridium-based material or a ceria- and ruthenium-based material. In some embodiments, the metal oxide is samarium doped ceria (SDC). In other embodiments, the metal oxide is lanthanum doped ceria (LDC). In some embodiments, the metal nanomaterial is a ceria- and iridium-based (e.g., SDC/Ir) metal nanomaterial, with the iridium being single atoms, nanoclusters, nanoparticles, or a combination thereof. In other embodiments, the metal nanomaterial is a ceria- and ruthenium-based (e.g., SDC/Ru) metal nanomaterial, with the ruthenium being single atoms, nanoclusters, nanoparticles, or a combination thereof.

The size of the metal may affect hybridization of the metal orbitals of the metal and the oxygen orbitals of the metal oxide as disclosed in Application Ser. No. 17/445,685 entitled "ELECTROCHEMICAL CELLS INCLUDING TUNABLE CATALYSTS, AND RELATED CARBON DIOXIDE HYDROGENATION SYSTEMS AND METHODS OF CARBON DIOXIDE HYDROGENATION," the disclosure of which application is incorporated by reference herein in its entirety. Depending on the extent of hybridization of the metal orbitals and the oxygen orbitals, the metal nanomaterial may function as a so-called "metallic metal" or as a so-called "ionic metal."

Referring now to FIG. 1, a schematic illustrating a method of producing the metal nanomaterial in accordance with embodiments of the disclosure is shown. The metal nanomaterial may be formed by a one-pot, sol-gel procedure that enables precursors 150 (e.g., the metal precursors and the metal oxide precursors) to be hydrolyzed at a controlled rate, producing atomic homogeneity of the metal in the metal nanomaterial. In accordance with this method, the precursors 150, which include the metal salts of the metal and of the metal oxide, and a suitable amount of the complexing agent (e.g., citric acid, ethylene glycol) are dissolved in water, which are controllably hydrolyzed to form a sol 152. The sol is heated at a higher temperature to produce a gel 154, with the metal cations substantially homogeneously dispersed in the gel 154. This method may result in the spatial distribution of the metal ions (e.g., transition metal ions, iridium ions, ruthenium ions) in a desired homogeneous manner.

The size of the metal in the resulting metal nanomaterial affects catalytic activity and selectivity of the metal nanomaterial. The metal nanomaterial formed according to embodiments of the disclosure may, for example, be used as a tunable catalyst to selectively form a carbonaceous product based on the particle size of the metal in the metal nanomaterial, as disclosed in Application Ser. No. 17/445,685 entitled "ELECTROCHEMICAL CELLS INCLUDING TUNABLE CATALYSTS, AND RELATED CARBON DIOXIDE HYDROGENATION SYSTEMS AND METHODS OF CARBON DIOXIDE HYDROGENATION."

The metal nanomaterial may be used to catalyze industrial reactions and electrochemical processes, such as in the petrochemical industry (e.g., ammonia industry and ethylene industry) and energy industry (e.g., Li-ion battery, metal air battery, supercapacitors, fuel cells and electrolyzers for use in fuel-efficient cars or biomass conversion processes). The metal nanomaterial may be used as a catalyst, such as an electrocatalyst. The metal nanomaterial produced according to embodiments of the disclosure may be used in a chemical system (e.g., an electrochemical system), with the metal stabilized on the metal oxide. The metal nanomaterial may be used as a catalyst, such as an electrocatalyst. The metal nanomaterial may, for example, be a metal-metal oxide (M-MO) catalyst, such as a M-MO heterostructure. The metal nanomaterial may exhibit multiple metal centers and, therefore, exhibit more active sites for dissociation and oxidation than a catalyst with a single metal center. To function as the catalyst, the metal nanomaterial may be incorporated into, for example, a negative electrode of the electrochemical system. The electrochemical system may, for example, be a proton conducting electrolyzer (PCE) that includes a positive electrode, a negative electrode including the metal nanomaterial formed according to embodiments of the disclosure, and an electrolyte. Conventional materials may be used for the positive electrode, the negative electrode, and the electrolyte and may be selected depending on the desired electrocatalytic activity of the electrochemical system. The catalytic activity of the metal nanomaterial may depend on a size of the metal in the metal nanomaterial.

The following examples serve to explain embodiments of the disclosure in more detail. These examples are not to be construed as being exhaustive or exclusive as to the scope of this invention.

Examples

Example 1: SDC Formation

SDC powder was synthesized using a sol-gel process. Samarium nitrate hexahydrate ($Sm(NO_3)_3 \cdot 6H_2O$) and cerium nitrate hexahydrate ($Ce(NO_3)_3 \cdot 6H_2O$) in a molar ratio of 1:3 were dissolved in distilled water. Then, citric acid and ethylene glycol were added as the complexing agent to the above solution to form a sol, which acts as a precursor for the sol-gel. The molar ratio of metallic ions: citric acid:ethylene glycol was 1:2:2. The sol was heated at 90° C. under stirring to gradually remove water from the sol. It was noticed that the liquid evolved towards the formation of a gel-like diaphasic material containing both a solvent phase and continuous polymer networks. The remaining solvent was removed in a drying process at 300° C., followed by thermal treatment in air at 600° C. for 5 hours, forming a pure SDC phase.

Example 2: SDCIr_SG Formation

SDCIr_SG was prepared following the same procedure in Example 1, except that ammonium hexachloroiridate ($(NH_4)_2IrCl_6$) was added into the initial precursor solution along with the samarium nitrate hexahydrate and cerium nitrate hexahydrate. The samarium nitrate hexahydrate, cerium nitrate hexahydrate, and ammonium hexachloroiridate were dissolved in distilled water. Then, citric acid and ethylene glycol were added as the complexing agent into the precursor solution to form a sol. The molar ratio of metallic ions:citric acid:ethylene glycol was 1:2:2. The sol was heated at 90° C. under stirring to gradually remove water. The remaining solvent was removed in a drying process at 300° C., followed by thermal treatment in air at 600° C. for 5 hours, forming the sol-gel. Following the calcination, the iridium atoms were incorporated into the SDC lattice at the atomic level, forming an ordered solid solution (SDCIr_SG). After reduction with $H_2$, iridium cations ere exsolved as nanoclusters and as stabilized single atoms on the SDC surface to produce a SDCIr-O catalyst that featured largely Ir—O bonding character with a high degree of Ir—O hybridization. The spatial distribution of the iridium ions in a desired homogeneous manner was achieved in the polymer networks, resulting in the homogeneous distribution in the SDC lattice after reduction.

The dispersity of iridium atoms was greatly dependent on the concentration of complexing agent used, and the distribution of iridium atoms was easily altered by modifying the sol-gel process. The concentrations of citric acid and ethylene glycol were decreased, to the molar ratio of metallic ions:citric acid:ethylene glycol at 1:0.1:0.1. A disordered solid solution, denoted as SDCIr, was obtained after the final calcination. Upon reduction in $H_2$ at 400° C. for 0.5 hour, SDC fluorite structures were maintained in both SDCIr_SG and SDCIr catalysts, but Ir atoms were extracted from the host lattice, forming SDCIr-O and SDCIr-Ir respectively.

Example 3: LDC Formation $La_{0.25}Ce_{0.75}O_{1.875}$ (LDC) powder was prepared using a similar sol-gel process as described in Example 1. Lanthanum nitrate hexahydrate ($La(NO_3)_3 \cdot 6H_2O$) and cerium nitrate hexahydrate ($Ce(NO_3)_3 \cdot 6H_2O$) with a molar ratio of 1:3 were dissolved in distilled water, followed by adding citric acid and ethylene glycol as the complexing agent. The molar ratio added to the precursor solution included metallic ions:citric acid:ethylene glycol of 1:2:2. The obtained aqueous solution was heated at 90° C. with agitation and was converted into a viscous gel, which was dried at 300° C. to form a black foamy intermediate product. The foam was ground into a fine powder and calcined at 600° C. for 5 hours in air to obtain the LDC powder.

Figure 2:
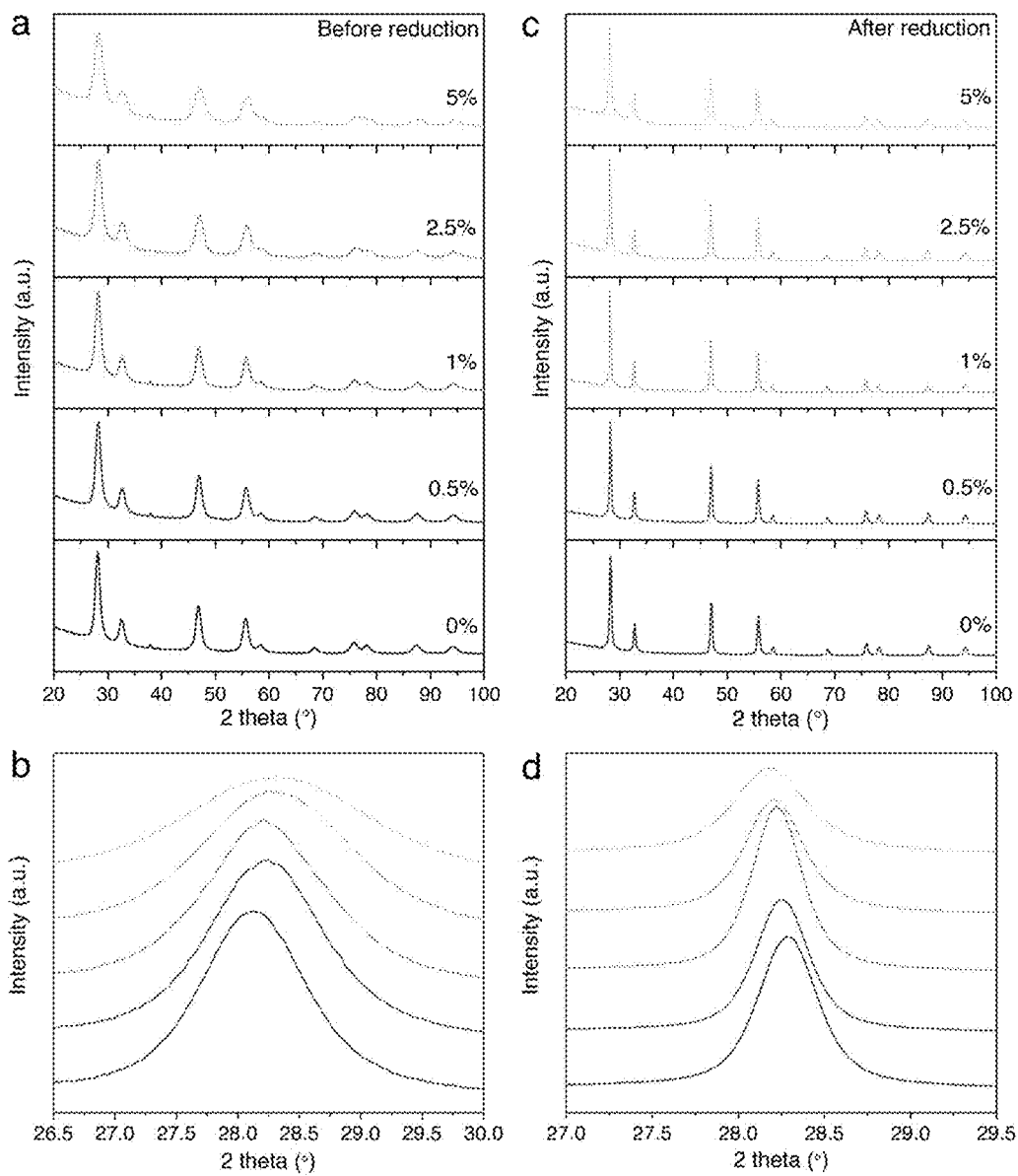
FIG. 2 are X-ray diffraction pattern (XRD) plots of as-synthesized $Ru_{2y}La_{0.25-y}Ce_{0.75-y}O_{2-x}$ solid solutions (a, b) and Ru/LDC catalysts (c, d)

Example 4: Ru/LDC Formation $Ru_{2x}La_{0.25-x}Ce_{0.75-x}O_{1.875+(x/2)}$ (RLCO) solid solutions were prepared using the same procedure as in Example 2, except using ammonium hexachloroiridate ($(NH_3)_6RuCl_3$) as the precursor of ruthenium. RLCO solid solutions including 0.5 wt. %, 1 wt. %, 2.5 wt. % and 5 wt. % were produced. The hydrothermal exsolution process was carried out in wet $H_2$ at 400° C. to obtain the x % Ru/LDC catalysts (x=0.5 wt. %, 1 wt. %, 2.5 wt. % and 5 wt. %). Upon this treatment, the ruthenium cations were exsolved from the fluorite lattice to form well-distributed Ru/LDC heterostructures with multiple OH species anchoring onto the surface oxygen vacancies. 5 wt. % Ru NPs [$(NH_3)_6RuCl_3$ solution as the precursor] were impregnated into the LDC to prepare the LDC/5% Ru. XRD plots of the as-synthesized $Ru_{2y}La_{0.25-y}Ce_{0.75-y}O_{2-x}$ solid solutions (a, b) and Ru/LDC catalysts (c, d) are shown in FIG. 2. As the Ru content increased, the coordination numbers of Ru atoms increased as well as the particle size. Because of the incorporation of ruthenium into the LDC, the diffraction peaks of $Ru_{2y}La_{0.25-y}Ce_{0.75-y}O_{2-x}$ shifted towards higher angles with the increasing of the ruthenium content. The exsolution of Ru led to the decrease of the lattice parameters. Because of the exsolution of ruthenium from the LDC lattice, the diffraction peaks of the reduced samples shifted towards lower angles with the increasing of ruthenium content. The exsolution of ruthenium led to the increase of the lattice parameters.

Figure 3:
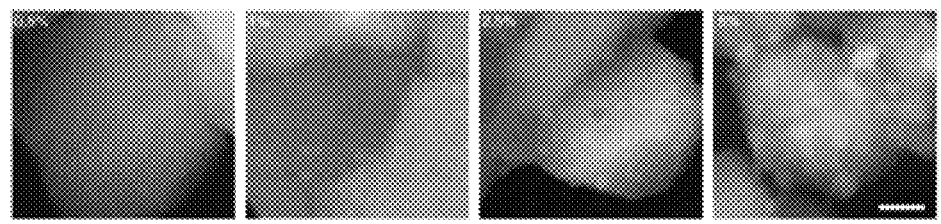
FIG. 3 are high-angle annular dark-field-scanning transmission electron microscopy (HAADF-STEM) images of the as-synthesized Ru/LDC catalysts with different ruthenium loadings (0.5 wt. %, 1 wt. %, 2.5 wt. %, and 5 wt. %)
Figure 4:
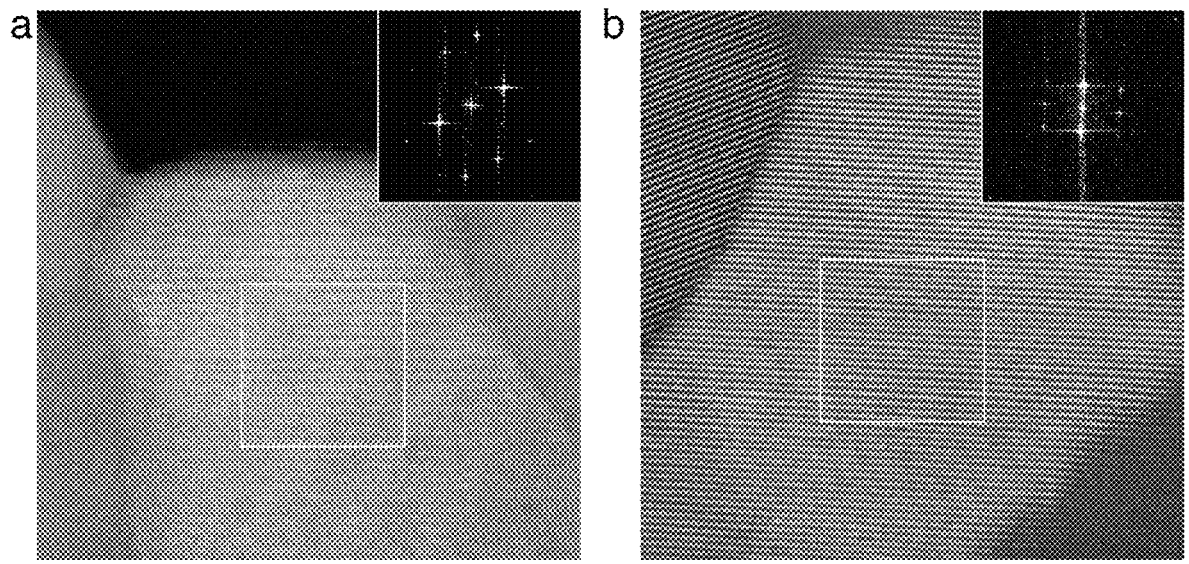
FIG. 4 are high resolution STEM images of as-synthesized Ru—La—Ce trimetal oxide solid solution. a) solid solution precursor for 1 wt. % Ru/LDC, and b) solid solution precursor for 5 wt. % Ru/LDC.

High-angle annular dark-field-scanning transmission electron microscopy (HAADF-STEM) images and STEM-Energy-dispersive X-ray spectroscopy (EDX) results are shown of the as-synthesized Ru/LDC catalysts at different ruthenium loadings (0.5 wt. %, 1 wt. %, 2.5 wt. %, and 5 wt. %) in FIGS. 3 and 4. The STEM image (FIG. 3) showed the presence of exsolved ruthenium species with dimensions depending on the Ru loadings. Chemical composition analysis confirmed the creation of well-distributed, size-varied Ru/LDC heterostructures. By contrast, there were no ruthenium NPs/NCs present in the pristine RLCO solid solutions, confirming that the ruthenium atoms were first incorporated into the lattice during calcination in the air and then exsolved from the solid solution on hydrothermal reduction.

The exsolution relied on the homogeneous incorporation of ruthenium cations into the LDC host lattice. The complexing agents were added to promote the hydrolysis reaction, ensuring the high dispersion of the ruthenium cations during the gel preparation. The gel precursors were calcined under the oxidizing condition to produce a series of RLCO tri-metal oxide solid solutions. The hydrothermal exsolution process was carried out in wet $H_2$ at 400° C. Upon this treatment, the ruthenium cations were exsolved from the fluorite lattice to form well-distributed Ru/LDC heterostructures with multiple *OH species anchoring on the surface oxygen vacancies. The ruthenium cations substitute for cerium or lanthanum in the fluorite structure in the air calcination step and exsolved from the RLCO tri-metal oxide in the hydrothermal reduction act, as shown in FIG. 4. The high resolution STEM images of the RLCO solid solutions confirm that ruthenium atoms have been incorporated into the bulk, forming a single phase structure. Fast Fourier transform (FFT) patterns demonstrated that there are no detectable diffraction signals related to Ru species before the reduction, implying that the ruthenium atoms were incorporated into the LDC lattice.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of forming a metal nanomaterial, comprising;
    forming an aqueous precursor solution comprising a metal precursor and a metal oxide precursor, the metal precursor comprising a metal salt including ruthenium and the metal oxide precursor comprising samarium nitrate and cerium nitrate;
    adding a complexing agent to the aqueous precursor solution;
    hydrolyzing the metal precursor and the metal oxide precursor to form a sol;
    heating the sol to form a gel;
    calcining the gel to incorporate metal cations from the metal precursor into a metal oxide lattice from the metal oxide precursor;
    exposing the calcined gel to a reducing agent to exsolve the metal from the metal oxide lattice; and
    forming a metal nanomaterial comprising a metal of the metal salt and a metal oxide of the metal oxide precursor, a particle size of the metal in the metal nanomaterial determined by an amount of the complexing agent added to the aqueous precursor solution and the amount of the complexing agent controlling a hydrolysis rate of the metal cations in the aqueous precursor solution, the metal of the metal nanomaterial exhibiting a substantially uniform particle size.

2. The method of claim 1, wherein forming an aqueous precursor solution comprises forming the aqueous precursor solution comprising water, the metal salt including ruthenium, and two or more of the samarium nitrate, the cerium nitrate, and other lanthanide element salts.

3. The method of claim 1, wherein adding a complexing agent to the aqueous precursor solution comprises adding citric acid, ethylene glycol, ethylenediaminetetraacetic acid (EDTA), ethylene glycol tetraacetic acid (EGTA), nitrilotriacetic acid, n-hydroxyethylethylenediamine-triacetic acid (HEDTA), a polycarboxylate, a polyol, a phosphate, a sulfate or a combination thereof to the aqueous precursor solution.

4. The method of claim 1, wherein adding a complexing agent to the aqueous precursor solution comprises adding citric acid and ethylene glycol to the aqueous precursor solution.

5. The method of claim 1, wherein forming a metal nanomaterial comprises forming the metal of the metal nanomaterial exhibiting single atoms exhibiting the substantially uniform particle size.

6. The method of claim 1, wherein forming a metal nanomaterial comprises forming the metal of the metal nanomaterial comprising nanoclusters comprising from 2 metal atoms to 100 metal atoms and exhibiting the substantially uniform particle size.

7. The method of claim 1, wherein forming a metal nanomaterial comprises forming the metal of the metal nanomaterial comprising nanoparticles exhibiting a particle size of from about 1 nm to about 999 nm and exhibiting the substantially uniform particle size.

8. A method of forming a metal nanomaterial, comprising;
    forming an aqueous precursor solution comprising a metal precursor and a metal oxide precursor;
    adding a complexing agent to the aqueous precursor solution;
    hydrolyzing the metal precursor and the metal oxide precursor to form a sol;
    heating the sol to form a gel;
    calcining the gel to incorporate metal cations from the metal precursor into a metal oxide lattice from the metal oxide precursor;
    exposing the calcined gel to a reducing agent to exsolve the metal from the metal oxide lattice; and
    forming the metal nanomaterial comprising an iridium/samarium-doped ceria material, a particle size of the metal in the metal nanomaterial being substantially uniform and determined by an amount of the complexing agent added to the aqueous precursor solution and the amount of the complexing agent controlling a hydrolysis rate of the metal cations in the aqueous precursor solution.

9. A method of forming a metal nanomaterial, comprising;
    forming an aqueous precursor solution comprising a metal precursor and a metal oxide precursor;
    adding a complexing agent to the aqueous precursor solution;
    hydrolyzing the metal precursor and the metal oxide precursor to form a sol;
    heating the sol to form a gel;
    calcining the gel to incorporate metal cations from the metal precursor into a metal oxide lattice from the metal oxide precursor;
    exposing the calcined gel to a reducing agent to exsolve the metal from the metal oxide lattice; and
    forming the metal nanomaterial comprising a ruthenium/lanthanum-doped ceria material, a particle size of the metal in the metal nanomaterial being substantially uniform and determined by an amount of the complexing agent added to the aqueous precursor solution and the amount of the complexing agent controlling a hydrolysis rate of the metal cations in the aqueous precursor solution.

10. The method of claim 1, wherein forming a metal nanomaterial comprises forming the metal in the metal nanomaterial comprising a predetermined particle size.

11. A method of forming a metal nanomaterial, comprising;
providing an aqueous precursor solution comprising a metal precursor, a metal oxide precursor, and a complexing agent, the metal oxide precursor comprising a samarium salt and a cerium salt;
hydrolyzing the metal precursor and the metal oxide precursor to form a sol;
incorporating metal cations of the metal precursor into a metal oxide of the metal oxide precursor; and
exsolving the metal cations to form a metal nanomaterial comprising a metal and the metal oxide, the metal of the metal nanomaterial exhibiting a substantially uniform size, a particle size of the metal in the metal nanomaterial determined by an amount of the complexing agent added to the aqueous precursor solution and the amount of the complexing agent controlling a hydrolysis rate of the metal cations in the aqueous precursor solution.

12. The method of claim 11, wherein providing an aqueous precursor solution comprising a metal precursor, a metal oxide precursor, and a complexing agent comprises providing a nitric salt, a chloride salt, an ammonium salt, an amine salt, or combinations thereof of the metal precursor and a samarium nitrate salt and a cerium nitrate salt of the metal oxide precursor.

13. The method of claim 11, wherein hydrolyzing the metal precursor and the metal oxide precursor comprises adding a concentration of the complexing agent sufficient to form the metal of the substantially uniform size.

14. The method of claim 11, wherein providing an aqueous precursor solution comprising a metal precursor, a metal oxide precursor, and a complexing agent comprises providing the metal precursor, the metal oxide precursor, citric acid, and ethylene glycol, wherein a molar ratio of metal cations:citric acid:ethylene glycol is 1:2:2.

15. The method of claim 11, further comprising removing water after incorporating metal cations of the metal precursor into a metal oxide of the metal oxide.

16. The method of claim 11, wherein exsolving the metal cations to form a metal nanomaterial comprises forming the metal nanomaterial comprising iron, cobalt, nickel, copper, ruthenium, rhodium, palladium, silver, iridium, platinum, or gold.

17. The method of claim 11, wherein exsolving the metal cations to form a metal nanomaterial comprises calcining the metal cations in air.

18. A method of forming a metal nanomaterial, comprising;
adding a complexing agent to an aqueous precursor solution comprising a metal precursor and a metal oxide precursor, the metal precursor comprising a metal salt including iridium;
hydrolyzing the metal precursor and the metal oxide precursor to form a sol;
incorporating metal cations of the metal precursor into a metal oxide of the metal oxide precursor; and
calcining the metal cations to form a metal nanomaterial comprising the metal and the metal oxide, the metal comprising a predetermined substantially uniform particle size, a particle size of the metal in the metal nanomaterial determined by an amount of the complexing agent added to the aqueous precursor solution and the amount of the complexing agent controlling a hydrolysis rate of the metal cations in the aqueous precursor solution.

19. The method of claim 18, wherein calcining the metal cations to form a metal nanomaterial comprises forming the metal nanomaterial comprising the metal substantially homogeneously dispersed therein.

20. The method of claim 18, wherein calcining the metal cations to form a metal nanomaterial comprises exposing the metal cations and the metal oxide to hydrogen gas.

21. The method of claim 18, wherein adding a complexing agent to an aqueous precursor solution comprising a metal precursor and a metal oxide precursor comprises adding the complexing agent to the aqueous precursor solution at a molar ratio of metal ions:complexing agent of from about 1.0:0.2 to about 1.0:6.0.

22. A method of forming a metal nanomaterial, comprising:
forming an aqueous precursor solution comprising a metal precursor and a metal oxide precursor;
adding a complexing agent to the aqueous precursor solution;
hydrolyzing the metal precursor and the metal oxide precursor to form a sol;
heating the sol to form a gel;
calcining the gel to incorporate metal cations from the metal precursor into a metal oxide lattice from the metal oxide precursor, the metal oxide lattice comprising ceria ($CeO_2$), samarium doped ceria (SDC), or lanthanum doped ceria (LDC);
exposing the calcined gel to a reducing agent to exsolve the metal from the metal oxide lattice; and
forming a metal nanomaterial comprising a metal and a metal oxide, a particle size of the metal in the metal nanomaterial determined by an amount of the complexing agent added to the aqueous precursor solution and the amount of the complexing agent controlling a hydrolysis rate of the metal cations in the aqueous precursor solution, the metal exhibiting a substantially uniform particle size.

23. The method of claim 22, wherein adding a complexing agent to the aqueous precursor solution comprises adding citric acid and ethylene glycol to the precursor solution.

24. The method of claim 22, wherein adding a complexing agent to the aqueous precursor solution comprises adding a higher concentration of the complexing agent relative to the metal cations to form the metal in the metal nanomaterial exhibiting a size of from single atoms to metal nanoclusters comprising from 2 metal atoms to 100 metal atoms, the metal exhibiting the substantially uniform particle size.

25. The method of claim 22, wherein adding a complexing agent to the aqueous precursor solution comprises adding a lower concentration of the complexing agent relative to the metal cations to form the metal in the metal nanomaterial exhibiting a particle size of from about 1 nm to about 999 nm, the metal exhibiting the substantially uniform particle size.

26. The method of claim 22, wherein adding a complexing agent to the aqueous precursor solution comprises adding citric acid and ethylene glycol to the aqueous precursor solution in a ratio of metal cations:citric acid:ethylene glycol of 1:2:2.

27. The method of claim 22, wherein adding a complexing agent to the aqueous precursor solution comprises adding citric acid and ethylene glycol to the aqueous precursor solution in a ratio of metal cations:citric acid:ethylene glycol of 1.0:0.1:0.1.

* * * * *